US 008578323B2

(12) United States Patent
Chiang et al.

(10) Patent No.: US 8,578,323 B2
(45) Date of Patent: Nov. 5, 2013

(54) HIERARCHICAL PROGRAM SOURCE MANAGEMENT

(75) Inventors: Johnson Y. S. Chiang, Taipei (TW); Jeffrey C. H. Liu, Taipei (TW); Joey H. Y. Tseng, Taipei (TW); Jim C. L. Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/108,926

(22) Filed: May 16, 2011

(65) Prior Publication Data

US 2011/0296378 A1    Dec. 1, 2011

(30) Foreign Application Priority Data

May 31, 2010   (TW) .................. 99117403 A

(51) Int. Cl.
*G06F 9/44*    (2006.01)
(52) U.S. Cl.
USPC ........... 717/101; 717/105; 717/122; 717/113; 717/125

(58) Field of Classification Search
USPC ......................... 717/101, 105, 113, 122, 125
See application file for complete search history.

(56) References Cited

U.S. PATENT DOCUMENTS 6,698,013 B1 * 2/2004 Bertero et al. ................ 717/127

* cited by examiner

*Primary Examiner* — Don Wong
*Assistant Examiner* — Deric Ortiz
(74) *Attorney, Agent, or Firm* — Lee Law, PLLC; Christopher B. Lee

(57) ABSTRACT

A method, a system and a computer program product for hierarchical program source management retrieve a main program from a memory and initiate a layer representing a portion of the main program for editing on the display. Program code is edited within the layer in response to detected user programming inputs. A layer abstract syntax tree corresponding to the edited program code is generated. The layer abstract syntax tree is compared with a main program abstract syntax tree and a layer file is generated including the differences between the layer abstract syntax tree and the main program abstract syntax tree.

18 Claims, 11 Drawing Sheets

HIERARCHICAL PROGRAM SOURCE MANAGEMENT

RELATED APPLICATIONS

This application claims priority to and claims the benefit of patent application Ser. No. 099117403 titled "METHOD, SYSTEM, AND COMPUTER PROGRAM PRODUCT FOR HIERARCHICAL PROGRAM SOURCE MANAGEMENT," which was filed in the Intellectual Property Office Ministry of Economic Affairs Republic of China on May 31, 2010, and which is incorporated herein by reference in its entirety.

FIELD OF THE INVENTION

The present invention relates to methods, systems and computer program products for hierarchical program source management, and more particularly, to a method, a system and a computer program product for modular hierarchical program source management.

BACKGROUND

Software programming is presently developing very rapidly, thereby leading to ever-enhancing functions and increasingly voluminous program codes. Hence, it is quite common for programs to be developed by programmers working in collaboration or even by a transnational team. In the aforesaid situations, it is important to record, compare, and control program code versions.

In a conventional version control system, a programmer has to perform a "check-out" procedure on the control system before setting out to amend/edit program code. Upon completion of the amendment, the programmer has to perform a "check-in" procedure for the control system to record the versions of programs. Hence, programmers make sure that the version of a program they are editing is the latest one by making reference to the version numeral of the program. However, in the situation where a program is developed by groups of persons working in collaboration, conventional version management takes place on a file-by-file basis when version control is involved, and the same file includes different functions of different aspects.

BRIEF SUMMARY

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize in view of the description herein that the invention may be practiced without one or more of the specific features or advantages of a particular embodiment. In other instances, additional features and advantages may be recognized in view of the description herein in certain embodiments that may not be present in all embodiments of the invention.

A method for hierarchical program source management includes retrieving a main program from a memory; initiating a layer representing a portion of the main program for editing on a display; editing program code within the layer in response to detected user programming inputs; generating a layer abstract syntax tree corresponding to the edited program code; comparing the layer abstract syntax tree with a main program abstract syntax tree; and generating a layer file comprising differences between the layer abstract syntax tree and the main program abstract syntax tree.

A computer program product includes a computer readable storage medium including computer readable program code. The computer readable program code when executed on a computer causes the computer to: retrieve a main program from a memory; initiate a layer representing a portion of the main program for editing on a display; edit program code within the layer in response to detected user programming inputs; generate a layer abstract syntax tree corresponding to the edited program code; compare the layer abstract syntax tree with a main program abstract syntax tree; and generate a layer file comprising differences between the layer abstract syntax tree and the main program abstract syntax tree, A system for hierarchical program source management includes a display; a memory for storing a main program; and a processor programmed to provide a program development interface via the display and to retrieve the main program from a memory; initiate a layer representing a portion of the main program for editing on the display; edit program code within the layer in response to detected user programming inputs; generate a layer abstract syntax tree corresponding to the edited program code; compare the layer abstract syntax tree with a main program abstract syntax tree; and generate a layer file comprising differences between the layer abstract syntax tree and the main program abstract syntax tree.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 3 is a schematic view of an example program development interface according to an embodiment of the present subject matter;

FIG. 4A is a schematic view of a first change to the example program development interface of FIG. 3 according to an embodiment of the present subject matter;

FIG. 4B is a schematic view of a second change to the example program development interface of FIG. 3 according to an embodiment of the present subject matter;

FIG. 4C is a schematic view of a third change to the example program development interface of FIG. 3 according to an embodiment of the present subject matter;

DETAILED DESCRIPTION

Reference throughout this specification to "one embodiment," "an embodiment," or similar language means that a particular feature, structure, or characteristic described in connection with the embodiment is included in at least one embodiment of the present subject matter. Thus, appearances of the phrases "in one embodiment," "in an embodiment," and similar language throughout this specification may, but do not necessarily, all refer to the same embodiment.

Conception of the present subject matter resulted from recognition of certain limitations associated with conventional version control systems where systematically modular or hierarchical contents of program codes, as are required to assist programmers in performing quick and efficient selection of various functional modules to be selected, integrated, or edited, are unavailable, thereby failing to meet the demand for aspect-oriented-programming (AOP) and embody the fundamental spirit thereof.

For example, when developing a program, a programmer usually has to insert temporary program test codes, such as a debug code, into the program being developed. However, in an existing version control system, before performing a storage operation on a program, a programmer has to remove the aforesaid program test codes from the program, otherwise program code confusion may occur and cause troubles to other program developers. Afterward, before editing the program, the programmer has to insert the same test codes into the program again, thereby adding to the difficulty in the course of program development. In this regard, the efficiency of program development is hindered because program development teams cannot efficiently choose to share and/or ignore unnecessary program codes, whether they are temporary test codes or program modules having various functions. The present subject matter addresses these recognized issues.

Figure 1:
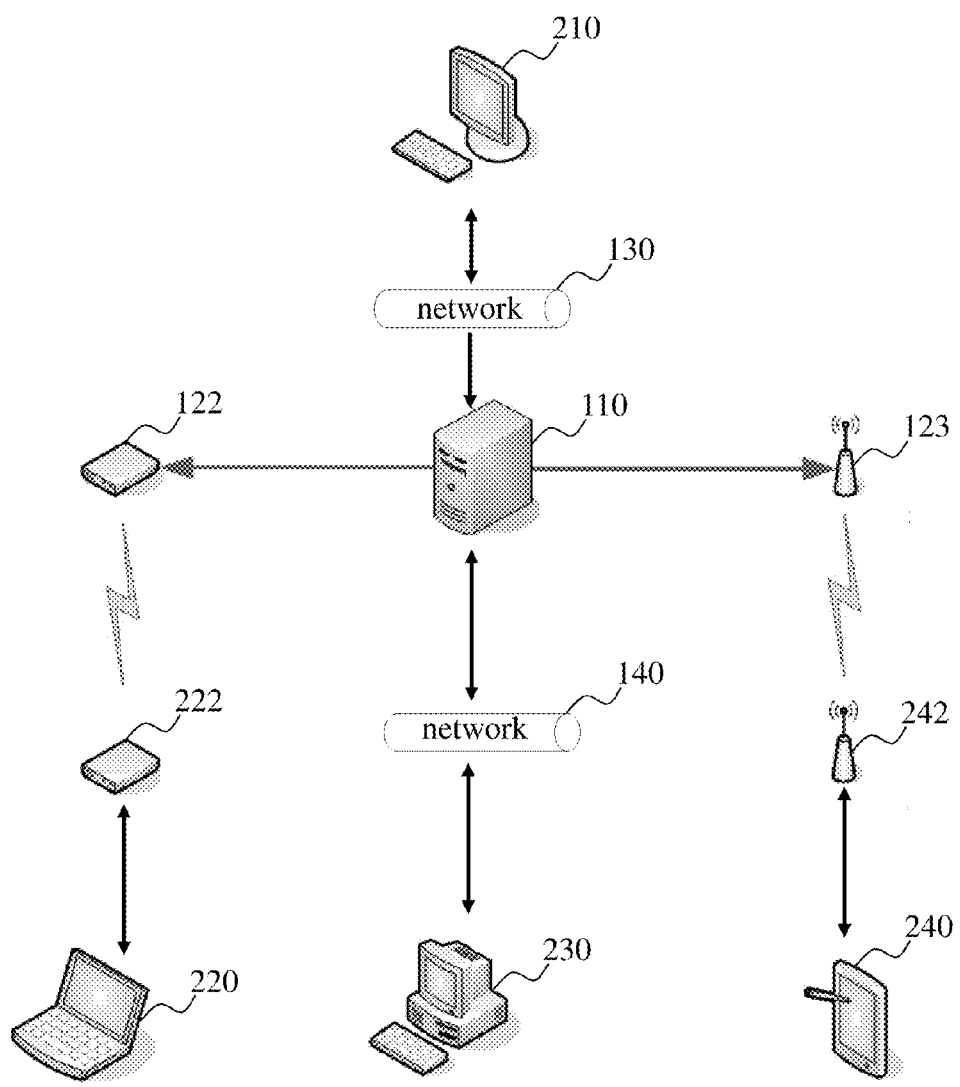
FIG. 1 is a schematic view of a system according to an embodiment of the present subject matter.

FIG. 1 is a diagram of an example of a system according to an embodiment of the present subject matter. In this example embodiment, the system includes a server 110, clients 210, 220, 230 and 240, which may be coupled and communicate with each other by any hardware structures and/or software protocols, such as Internet structure and transmission control protocol/Internet Protocol (TCP/IP) protocols, or any other communication techniques. The detailed descriptions hereunder are illustrated for purposes of example and not limitation.

The server 110 is a version management system for recording program codes and managing version information regarding a program. Conventional version management systems in wide use are, namely Current Version Systems (CVS), Subversion®, and Perforce®. In this example embodiment, the client 210 is connected to the server 110 by a high-speed broadband connection 130 (such as fiber-optic connection), and feeds back a revised main program UserManager.java to the server 110. Note that in the present description, the term "main program" may be different from the source code containing the "main function" routine of software. The server 110 stores the main program and records version information, for example, "version 15" in this example embodiment. Also, programmer Jim is developing a time-related information recording module of the program, wherein he works on his notebook computer in conjunction with a modem operating at a relatively low speed and has dial-up access to a modem 122 of the server 110 through a telecommunication network so as to initiate connection. Another programmer Jeffrey is developing a user data management module, wherein he works on dedicated computer equipment, such as the client 230, which is connected to the server 110 by a high-speed broadband leased-line connection 140 (such as a dedicated leased-line network). Another programmer Johnson is developing a user data change function module, wherein he is traveling and initiates a connection between a wireless communicator 242 of his or her smart phone (hereinafter referred to as the client 240) and a wireless communicator 123 of the server 110 to perform some editing and confirmation functions. Hence, the present subject matter neither limits the computer equipment or a connection device used by program developers nor limits the software development environment or the operating system used by program developers, as variation in the above disclosure does not have any effect on the implementation of the present subject matter.

Figure 2:
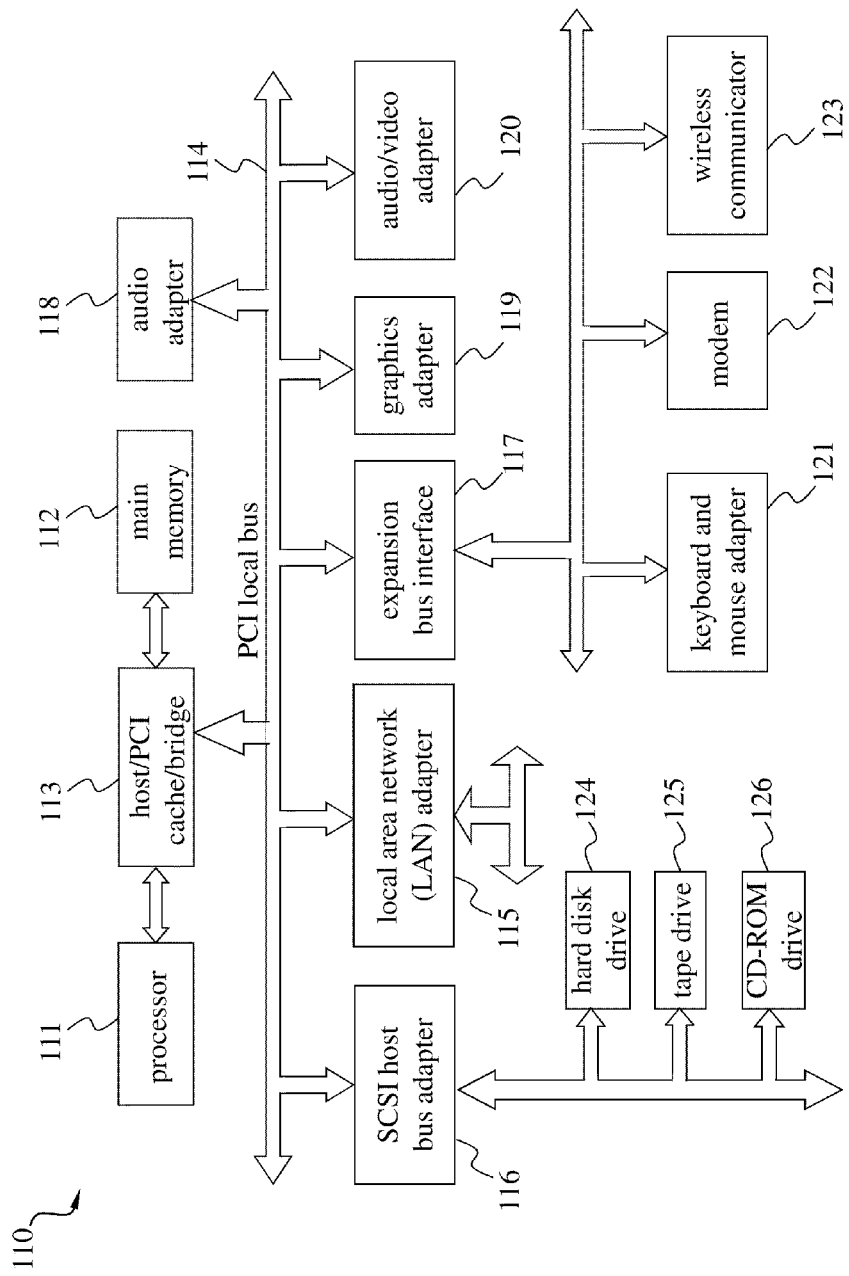
FIG. 2 is a schematic view of a server according to an embodiment of the present subject matter.

The server 110 may be embodied as a computer according to one embodiment of the present subject matter. For example, FIG. 2 is a block diagram of an example of the server 110 according to one embodiment of the present subject matter. In this example, the server 110 is a general-purpose computer, in which code or instructions implementing the processes of the present subject matter may be located. The server 110 employs a peripheral component interconnect (PCI) local bus architecture 114. Although the depicted example employs a PCI bus, other bus architectures such as Accelerated Graphics Port (AGP) and Industry Standard Architecture (ISA) may be used. Processor 111 and main memory 112 are connected to PCI local bus 114 through PCI bridge 113. PCI bridge 113 may also include an integrated memory controller and cache memory for processor 111. Additional connections to PCI local bus 114 may be made through direct component interconnection or through add-in boards.

In the depicted example, local area network (LAN) adapter 115, small computer system interface (SCSI) host bus adapter 116, and expansion bus interface 117 are connected to PCI local bus 114 by direct component connection. In contrast, audio adapter 118, graphics adapter 119, and audio/video adapter 120 are connected to PCI local bus 114 by add-in boards inserted into expansion slots. Expansion bus interface 117 provides a connection for a keyboard and mouse adapter 121, the modem 122, the wireless communicator 123, and additional memory. SCSI host bus adapter 116 provides a connection for a hard disk drive 124, a tape drive 125, and a CD-ROM drive 126. Typical PCI local bus implementations support three or four PCI expansion slots or add-in connectors.

Those of ordinary skill in the art will appreciate in view of the present description that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present subject matter may be applied to a multiprocessor data processing system. For example, the server 110, if optionally configured as a network computer, may not include the SCSI host bus adapter 116, the hard disk drive 124, the tape drive 125, and the CD-ROM 126. In that case, the computer, to be called a client computer, may include some type of network communication interface, such as the LAN adapter 115, the modem 122, the wireless communicator 123, or the like. An operating system runs on processor 111 and is used to coordinate and provide control of various components within server 110. The operating system may be a commercially available operating system such as Windows® XP, which is available from Microsoft® Corporation. An object oriented programming system such as Java® may run in conjunction with the operating system and provides calls to the operating system from Java® programs or applications executing on client 110. Java® is a trademark of Sun Microsystems®, Inc. Instructions for the operating system, the object-oriented programming system, and applications or programs are located on storage devices, such as the hard disk drive 124, and may be loaded into the main memory 112 for execution by the processor 111.

The clients 210, 220, 230 and 240 may have the same or similar structure as the above server 110, or other hardware structure, which is not limited here. For example, the clients 210, 220, 230 and 240 may be implemented as computers, notebooks, personal digital assistants (PDAs), smart phones, etc. It should be noted that the components shown in FIG. 2 are illustrated for purposes of example rather than restriction.

In this example embodiment, Jim, Jeffrey, and Johnson amend the main program, and the amended program codes are located at distinct layers, respectively, in a way known as hierarchical source management. The particulars about the initiation of a layer and amendment, management and storage of program codes are described in detail hereunder.

Figure 3:
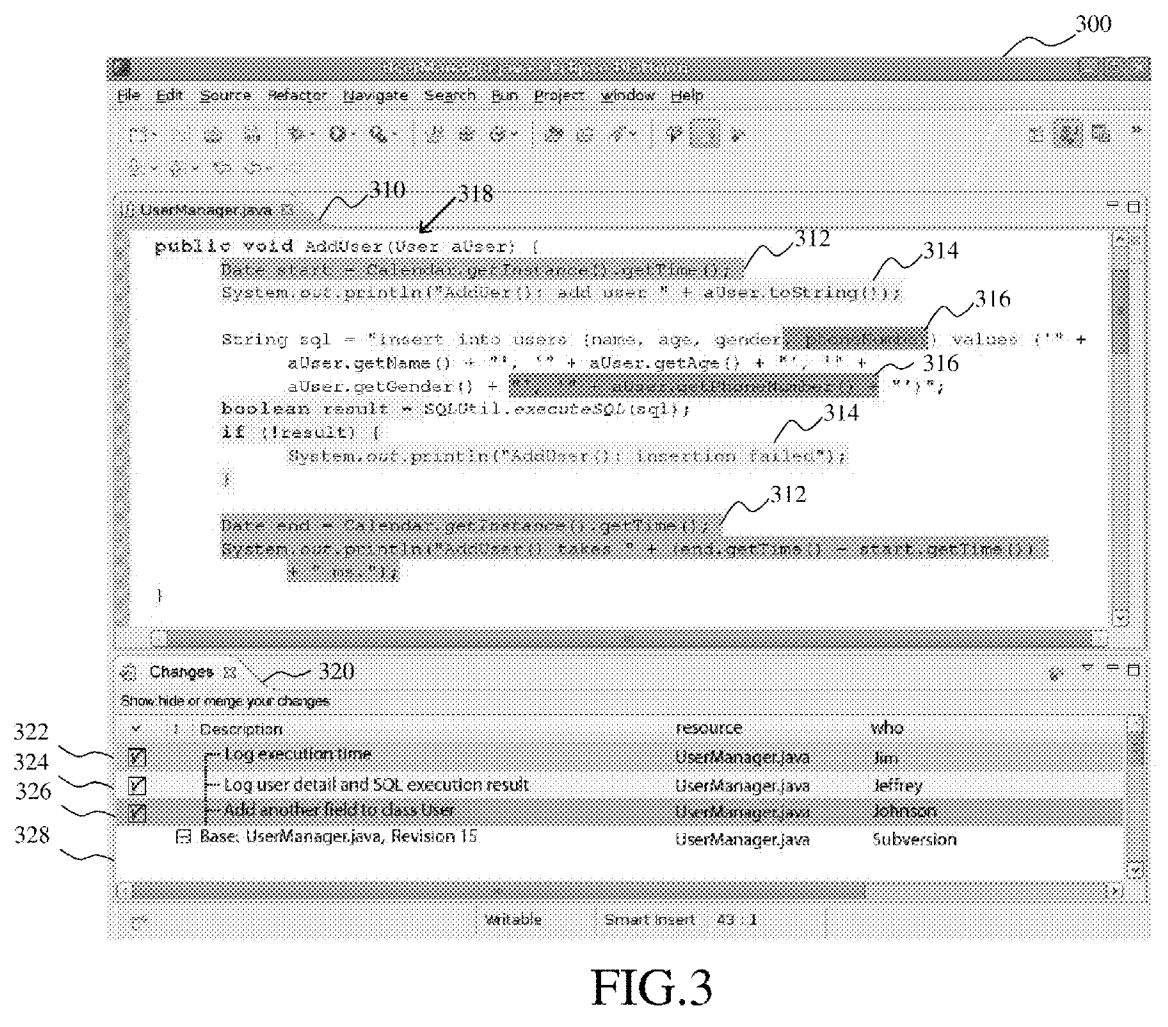

FIG. 3 is a schematic view of an example program development interface. Referring to FIG. 3, an example way of implementing the present subject matter is illustrated with a program development interface 300. The program development interface 300 (for example, performed in the Integrated Development Environment (IDE) in the client's computer and displayed in a displaying device, such as a LCD monitor, through the graphics adapter 119) has a program code displaying region 310 at the top and a layer management region 320 at the bottom. The layer management region 320 demonstrates four items of information, namely a time information recording layer 322 initiated by Jim, a user data managing layer 324 initiated by Jeffrey, a user data change/amending layer 326 initiated by Johnson, and a main program 328 on which the aforesaid three layers are based.

In this example embodiment, a new program developer retrieves from the server 110 a main program and related layer information and program codes concurrently, and displays the retrieved main program and related layer information and program codes in the program code displaying region 310. For example, the program code displaying region 310 contains program codes 312 corresponding to the time information recording layer 322, program codes 314 corresponding to the user data managing layer 324, program codes 316 corresponding to the user data change/amending layer 326, and program codes 318 corresponding to the main program 328. The program codes located at different layers, respectively, may be displayed by highlighting the difference between the layers in a conspicuous and recognizable manner. In this example embodiment, program codes located at different layers, respectively, are distinguished from each other according to background color. In other embodiments, it is feasible to differentiate between program codes located at different layers, respectively, according to text color, frame line, font, or transparency.

Figure 4A:
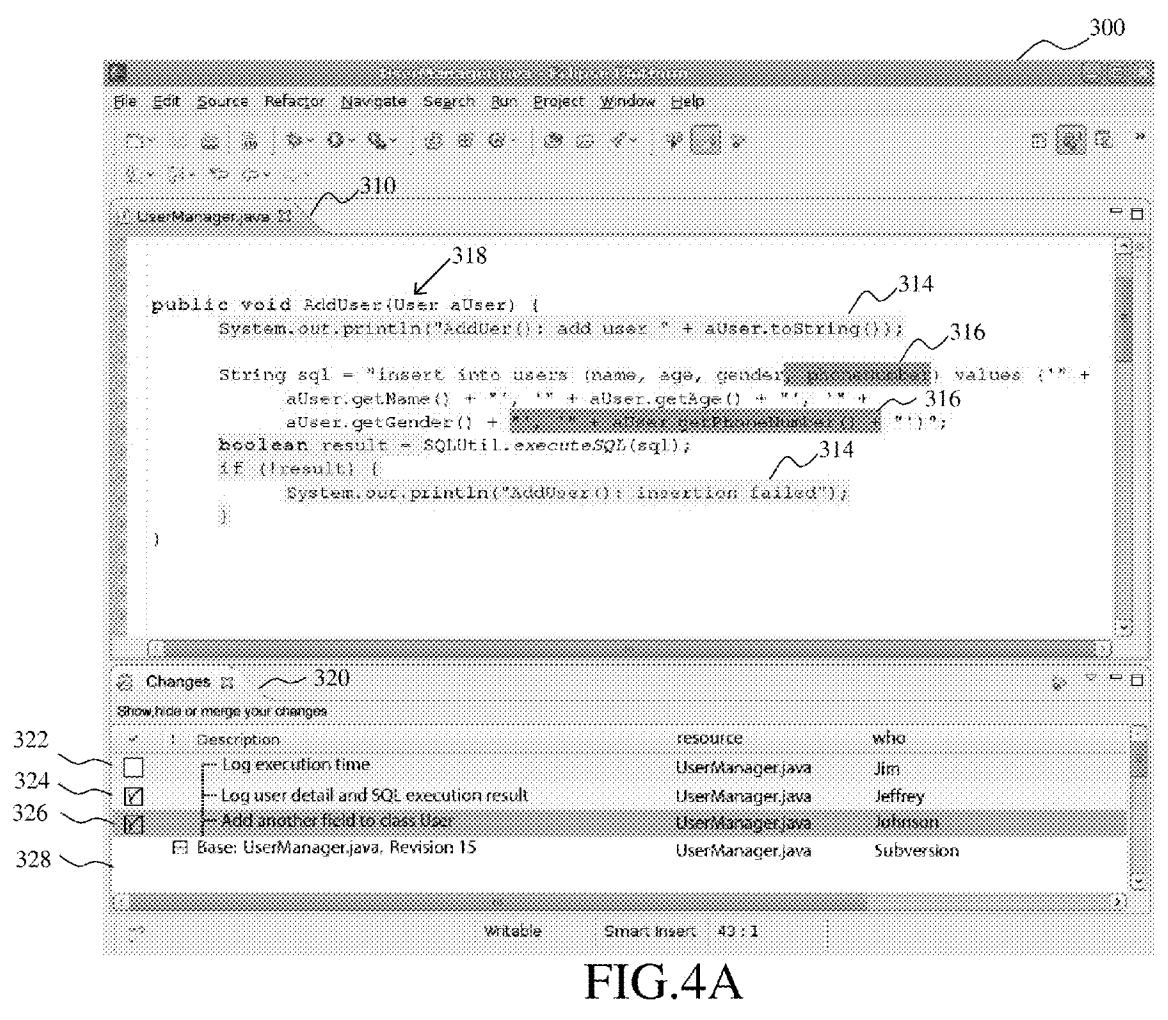
Figure 4B:
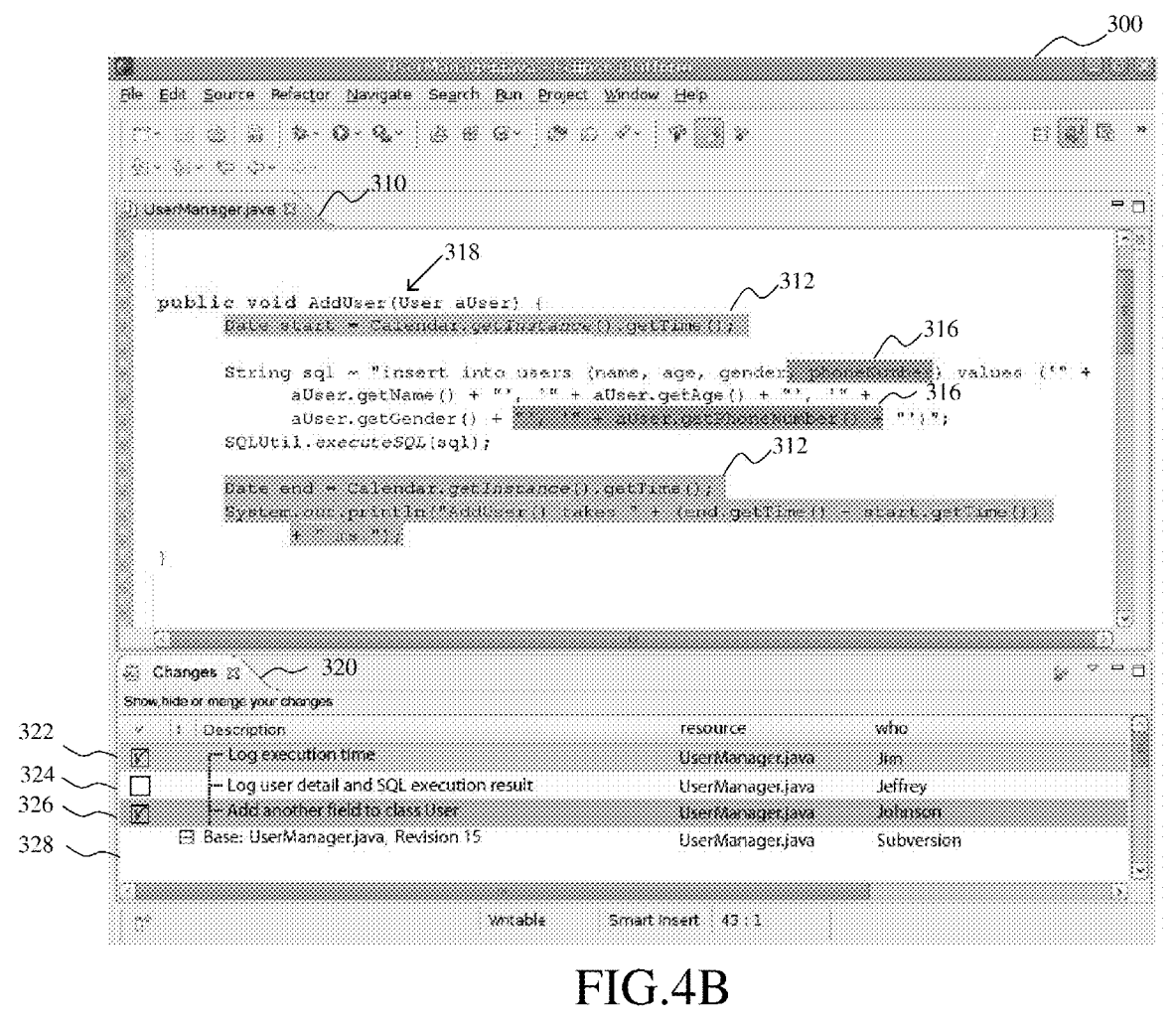
Figure 4C:
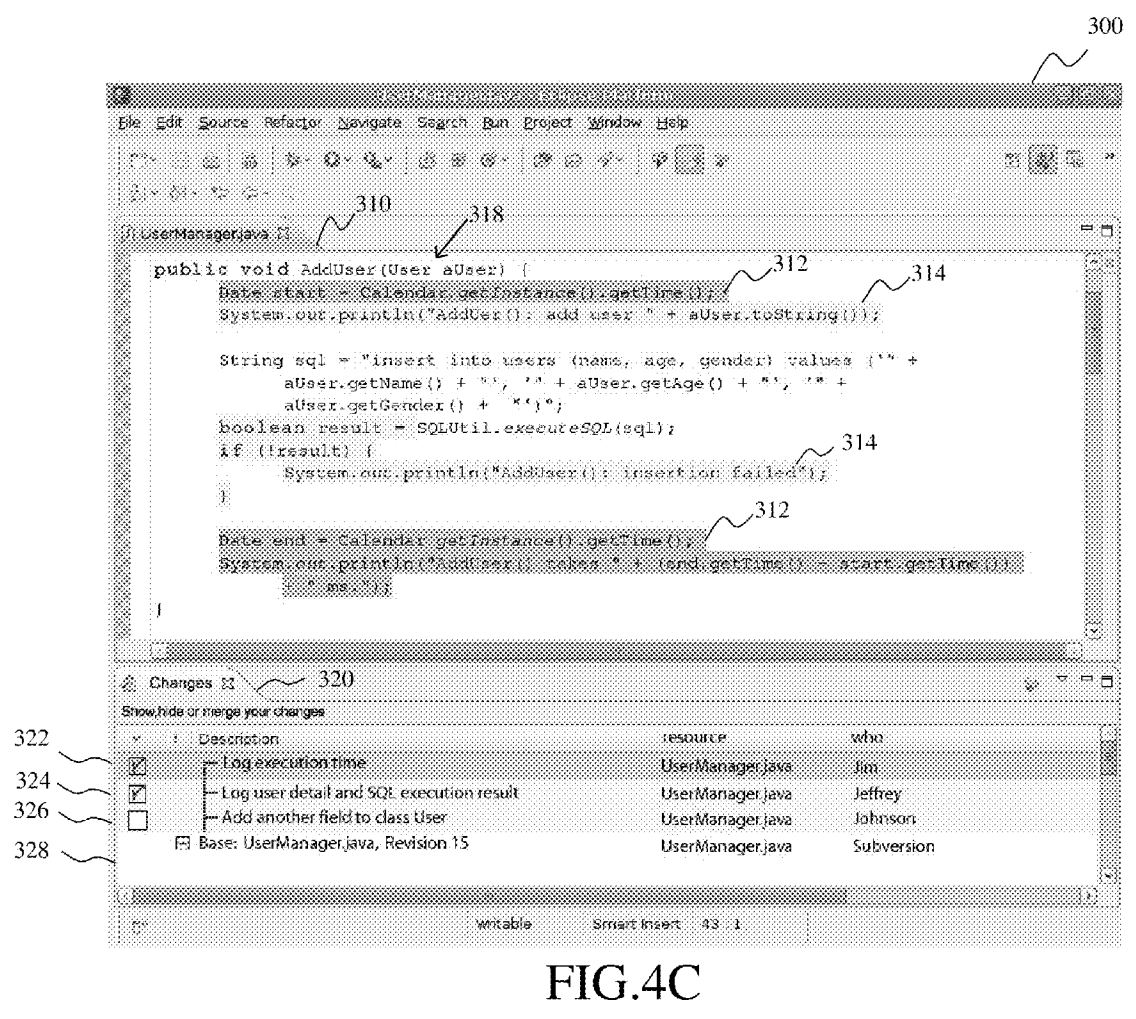

FIG. 4A through FIG. 4C show changes to the example program development interface of FIG. 3. As described in the aforesaid example embodiment, a program developer may readily recognize program codes located at different layers, respectively. Also, the program developer may further select any additional or omissible program codes, as shown in FIG. 4A through FIG. 4C. Referring to FIG. 4A, after deciding that the time information recording layer 322 is not required for program development in the course of thereof, a program developer disables the time information recording layer 322 in the layer management region 320, for example, by selecting the option box to the left of the item and then unchecking it as shown in FIG. 4A. In other embodiments, it is also feasible to select the option box by, for example, a selection button, drag-and-drop, or a right-click popup menu. As a result, the program codes 312 corresponding to the time information recording layer 322 are absent/removed from the program code displaying region 310. Likewise, after deciding that the user data managing layer 324 is not required for program development, a program developer disables the user data managing layer 324 in the layer management region 320 by selecting the option box to the left of the item and then unchecking it, such that the program codes 314 corresponding to the user data managing layer 324 are absent from the program code displaying region 310 as shown in FIG. 4B. Likewise, after deciding that the user data change/amending layer 326 is not required for program development, a program developer disables the user data change/amending layer 326 in the layer management region 320 by selecting the option box to the left of the item and then unchecking it, such that the program codes 316 corresponding to the user data change/amending layer 326 are absent from the program code displaying region 310 as shown in FIG. 4C.

The layer management region 320 may further display descriptive information about the layers, such as for example, the time information recording layer 322 displays the description "Log execution time" about the layer, the main program "UserManager.java" associated therewith (or another layer associated therewith in case of a sub-layer in other embodiments), and user "Jim" who initiates the layer. Likewise, the user data managing layer 324 and the user data change/amending layer 326 may also display corresponding descriptive information as shown in the figures. The descriptive information may be either generated manually or automatically at the time when the layer is initiated, or may be generated or edited after the layer has been initiated, without being limited by the present description.

Of course, in other embodiments, it is feasible to have less or more layers or intricate associative relationships between the layers. For example, a programmer may initiate sub-layers under a specific layer, such that the layers assume a tree-like architecture. Furthermore, a programmer may selectively merge two or more layers so as to initiate a new layer or flatten the main program 328 and the layers in whole or in part so as to initiate a new version of the main program 328 which, for example, may be "version 16" in this example embodiment. Likewise, the layers may also have their respective version information records to facilitate the control thereof. According to the present subject matter, the merging of the layers or the flattening of the layers and a main program is easy to accomplish, for example, by using an abstract syntax tree (AST) described in detail hereunder to deconstruct a program code and generate a layer file corresponding thereto.

It should be noted that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 5:
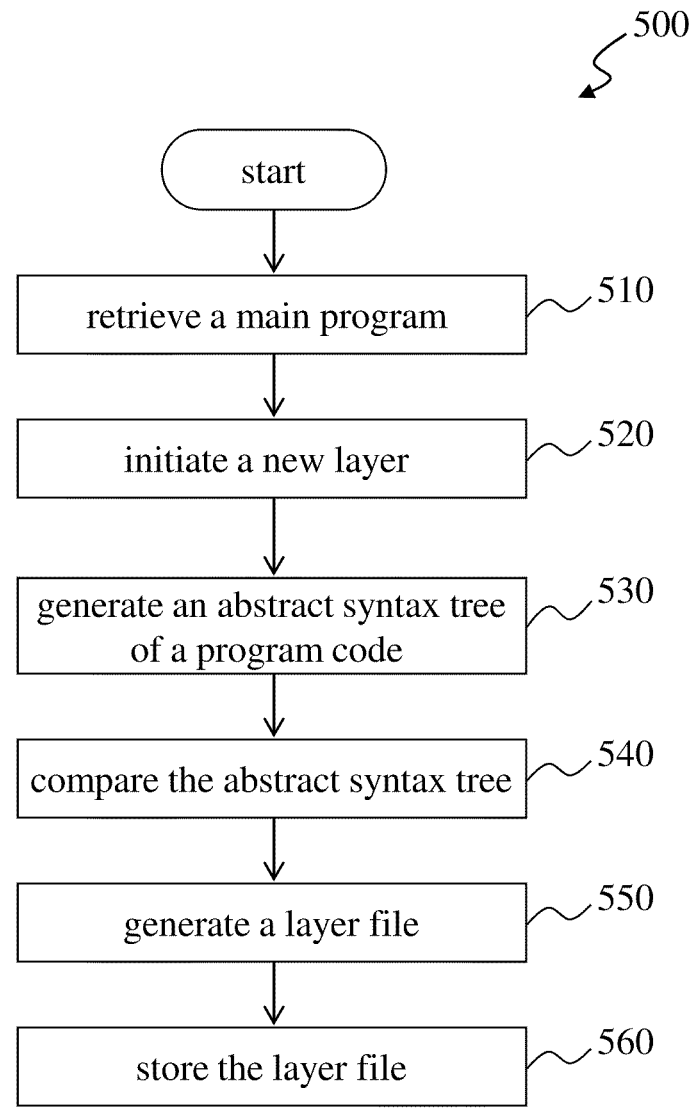
FIG. 5 is a flow chart of an example method for hierarchical program source management according to an embodiment of the present subject matter.

FIG. 5 is a flow chart of an example method for hierarchical program source management. Referring to FIG. 5, there is shown a flow chart of a method for hierarchical program source management according to an embodiment of the present subject matter. As shown in FIG. 5, in this example embodiment, a method 500 is exemplified by initiating the time information recording layer 322. In step 510, the main program 328 is retrieved so as to facilitate program editing. A point to note is that, in other embodiments, step 510 may also include retrieving other related layer files. The particulars about the implementation of related layer files are further described below. In this example embodiment, after Jim has retrieved the main program 328, that is, UserManager.java, step 520 includes initiating the time information recording layer 322 and editing the program codes 312 in the program code displaying region 310 in response to detected user programming inputs. The initiating of a layer representing a portion of the main program for editing may include displaying, highlighting, and/or otherwise providing the layer of program code for editing. The editing of the program codes 312 involves distinguishing the program codes 312 from the main program 328 by the aforesaid recognizable color or not displaying the difference, depending on a program developer's selection. Upon completion of the programming/editing of the program codes 312, step 530 includes generating abstract syntax trees of the program codes 312 so as to finalize the initiation of the time information recording layer 322.

Figure 6A:
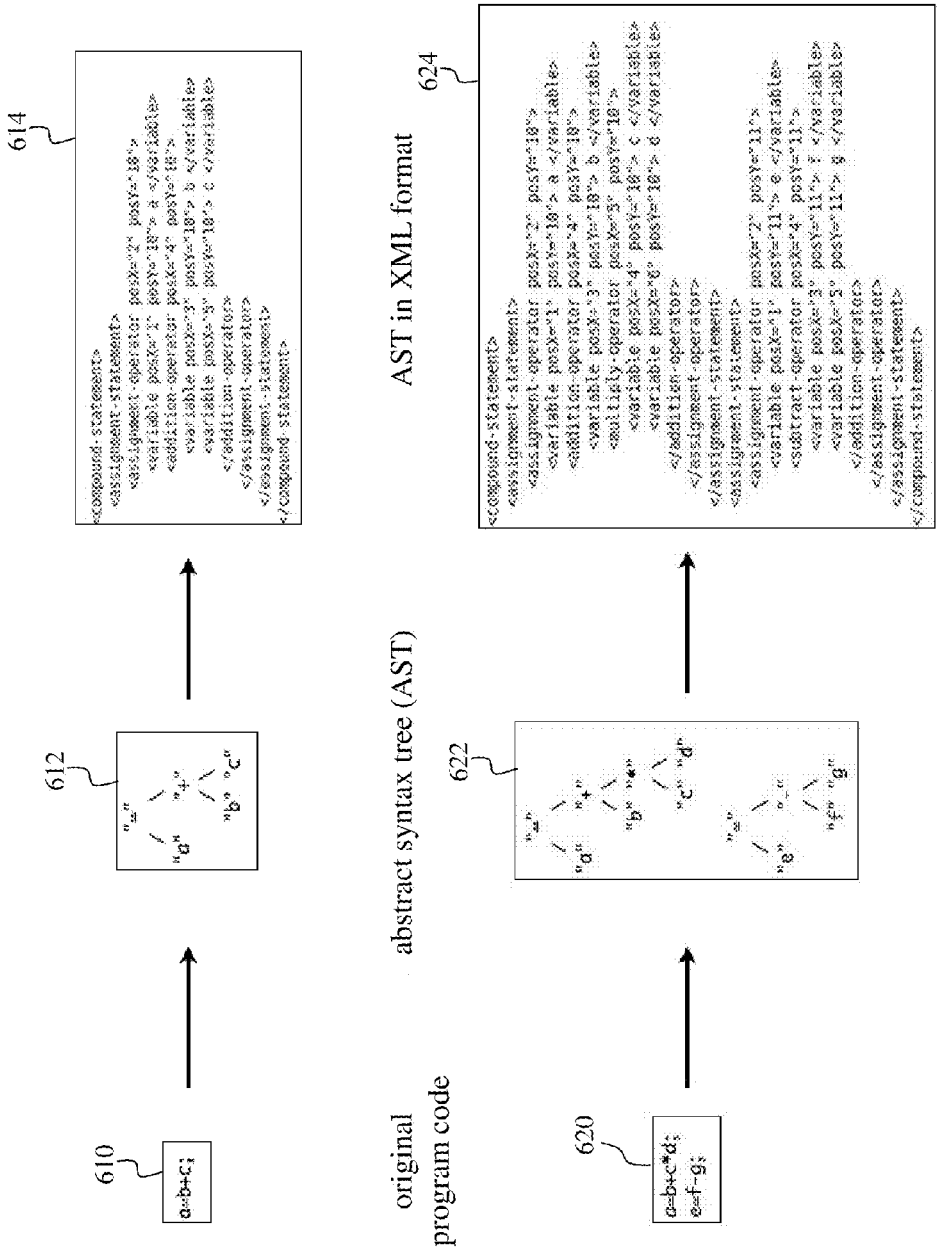
FIG. 6A is a schematic view of a first example of abstract syntax trees according to an embodiment of the present subject matter.
Figure 6B:
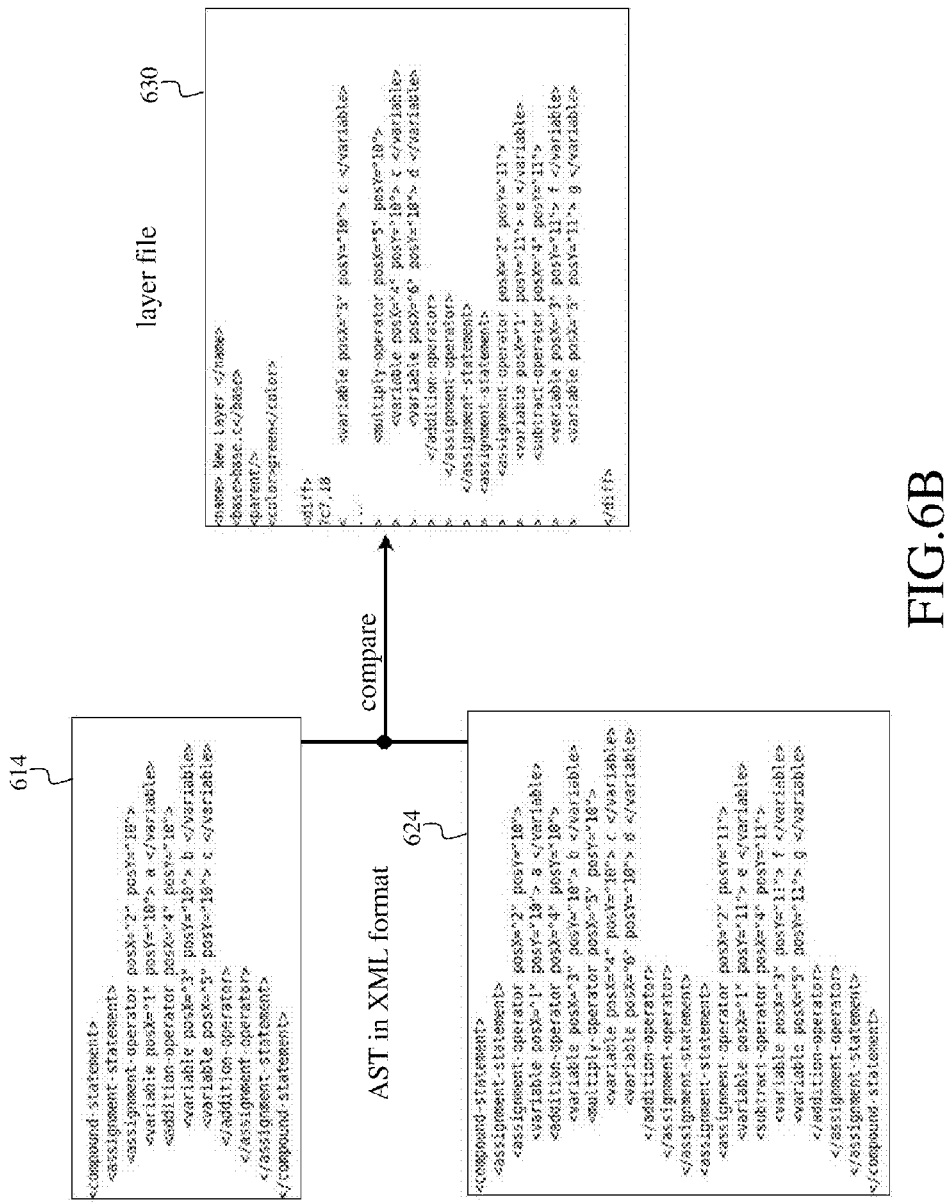
FIG. 6B is a schematic view of a second example of abstract syntax trees according to an embodiment of the present subject matter.

FIG. 6A through FIG. 6B are schematic views examples of abstract syntax trees. FIG. 6A illustrates example program code for describing the concept of abstract syntax trees. Shown at the top of FIG. 6A is a pre-amendment program code 610. Shown at the bottom of FIG. 6A is a post-amendment program code 620. Afterward, the program codes 610, 620 are decomposed to become corresponding abstract syntax trees 612, 622, respectively, as depicted by hierarchical tree-like diagrams. In practice, abstract syntax trees may be implemented by different presentations or in different formats. For example, in this example embodiment, abstract syntax trees are described in eXtensible Markup Language (XML), such as abstract syntax trees (AST) 614, 624 in XML format as shown in the drawing. A point to note is that, in other embodiments, it is also feasible to generate the abstract syntax trees by other deconstruction methods or in other storage formats without compromising the implementation of the present subject matter. For example, in other embodiments, it is also feasible to initiate the abstract syntax trees in JavaScript® Object Notation (JSON) format.

Step 540 includes comparing the abstract syntax tree 614 of the original program and the abstract syntax tree 624 of the amended program. In step 550, a layer file 630 shown in FIG. 6B is generated in accordance with the resultant difference between the abstract syntax tree 614 and the abstract syntax tree 624. In other words, the layer file 630 reflects the difference between the pre-amendment program and the post-amendment program. Finally, in step 560, the layer file 630 thus generated is stored. The layer file 630 records the filename of a fundamental main program, such as "base.c" in this example embodiment. Hence, given a layer file, the system may generate amended program codes from the main program corresponding to the layer file. In practice, it is feasible that the abstract syntax tree 614 of the original program is generated beforehand and then retrieved together with the pre-amendment/original program code 610 in step 510. Alternatively, in other embodiments, it is feasible that the main program exists directly in the form of an abstract syntax tree. As such, the above disclosure is not limited by the present description.

Figure 7A:
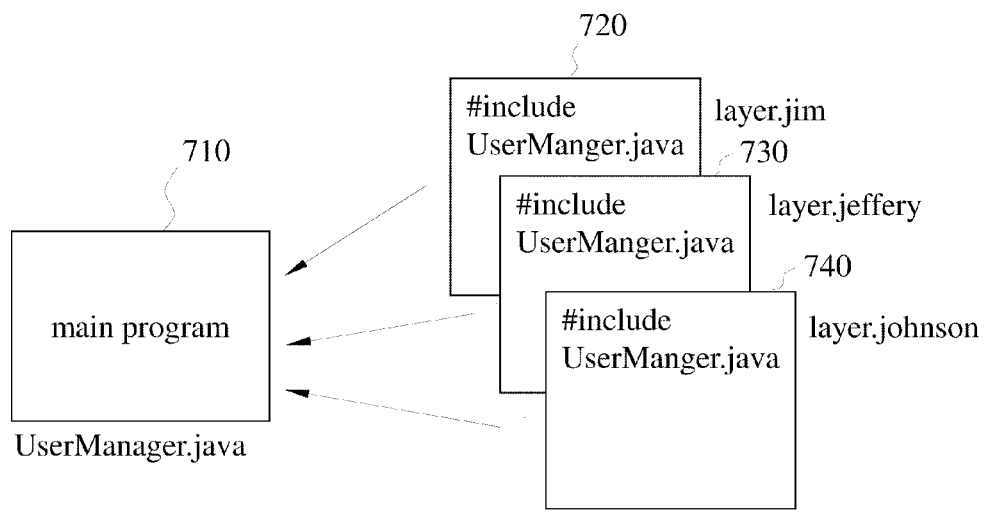
FIG. 7A is a schematic view of a main program and layers according to an embodiment of the present subject matter.

FIG. 7A is a schematic view of a main program and layers. In this example embodiment, the original main program and the original layer files which are actually stored in the server 110 may be stored therein in the form of a main program 710 and layer files 720, 730, and 740, respectively, as shown in FIG. 7A. In other embodiments, there may be less or more layer files and/or sub-layer files, or even more intricate associative relationship therebetween.

Figure 7B:
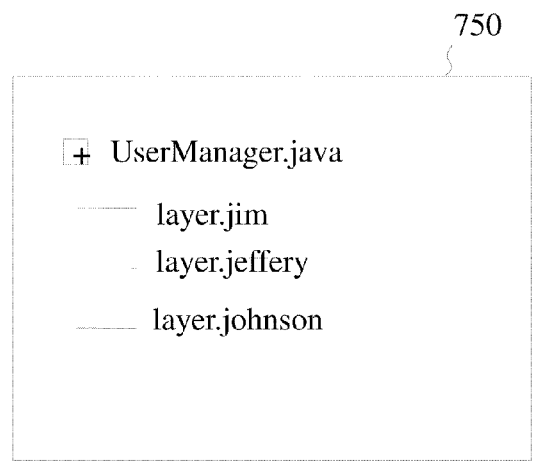
FIG. 7B is a schematic view of a layer file checklist according to an embodiment of the present subject matter.

FIG. 7B is a schematic view of a layer file checklist. In another embodiment, it is also feasible that a layer file checklist 750 as shown in FIG. 7B is stored in the server 110 and configured to record the associative relationship between the main program 710 and the layer files 720, 730, and 740, such that all the layer files associated with the main program 710 may be quickly retrieved.

Figure 8:
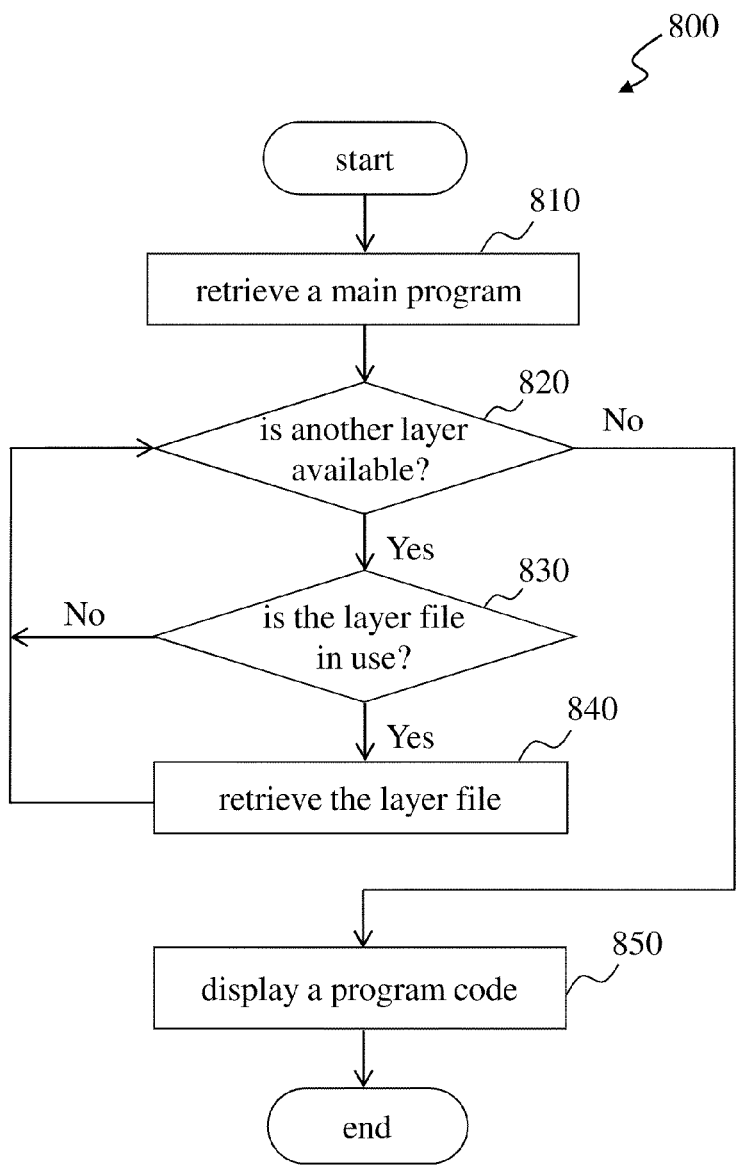
FIG. 8 is a flow chart of another method for hierarchical program source management according to an embodiment of the present subject matter.

FIG. 8 is a flow chart of another example method for hierarchical program source management according to an embodiment of the present subject matter. As shown in FIG. 8, a method 800 comprises: step 810 of retrieving a main program of the server by a program developer (or known as a user) through the client; step 820 of determining, by the layer file checklist 750 for example, whether another related layer is available; step 830 of determining, upon determination of the presence of a layer file associated with the main program, whether the layer file is in use, such as a layer which is shown in FIG. 4A through FIG. 4C and may be freely selected and retrieved by the user; step 840 of retrieving the corresponding layer file if it is determined that the layer is in use; and step 850 of displaying a program code 850 required, such as a program code shown in FIG. 4A through FIG. 4C, after all the layer files in use have been retrieved. Although this example embodiment only illustrates one of the ways of implementing the present subject matter, persons skilled in the art should understand that, in other embodiments, it is also feasible to retrieve all the layer files concurrently and then display the corresponding layer files in accordance with the utilization thereof, and that the aforesaid way of operation is unlikely to compromise the implementation of the present subject matter.

Accordingly, a program developer may easily initiate various layers and provide appropriate description thereof as needed. Examples of the aforesaid layers are, namely a program code layer for personal use, a temporary debug layer, or any other functions required for program development in the course thereof. The layers may be stored together without compromising the original main program. If any program developer wants to amend the main program, it will also be feasible to retrieve all the related layer files together and determine whether to include the program codes of the layer files in accordance with the functions of the layer files. In doing so, various program codes of different functions may be modularized or arranged in a hierarchy and readily shared between the users and reused. In addition, a program developer does not waste time adding to or removing from program codes any personal or temporary program codes every time before editing or after editing the program codes, respectively, thereby enhancing the efficiency of program development.

Persons skilled in the art should understand that the aforesaid implementation details and the description thereof are illustrative of, rather than restrictive of, the present subject matter. In fact, the present subject matter may still be subject to additional enhancements and changes without departing from the spirit of the present subject matter. For instance, the generation of abstract syntax trees and layer files may take place at the client end or occur at a server end without being limited by the present description. Alternatively, in this example embodiment, the present subject matter is implemented in an Integrated Development Environment (IDE), but, in other embodiments, the present subject matter is also applicable to other program editors or even a simple text editor. Alternatively, although this embodiment uses a multiple-person collaborative development environment having a central server for purposes of example, other embodiments may be implemented using a single-computer multiple-user program development environment, or a single-user scenario, without compromising the operation and features of the present subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description shown above is not intended to limit the scope of the present subject matter. Any equivalent variations or modifications without departing from the spirit disclosed by the present description should be included in the appended claims.

The invention claimed is:

1. A method for hierarchical program source management, comprising:
   retrieving a main program from a memory;
   initiating a layer representing a portion of the main program for editing on a display;
   editing program code within the layer in response to detected user programming inputs;
   generating a layer abstract syntax tree corresponding to the edited program code;
   comparing the layer abstract syntax tree with a main program abstract syntax tree; and
   generating a layer file comprising differences between the layer abstract syntax tree and the main program abstract syntax tree.

2. The method of claim 1, where retrieving the main program from the memory comprises:
   retrieving at least one layer file associated with the main program from the memory;
   displaying program code corresponding to the at least one layer file and the main program; and
   further comprising:
      determining whether to hide the program code corresponding to at least one of the at least one layer file in response to a detected user input from a user; and
      where initiating the layer representing the portion of the main program for editing on the display comprises initiating the layer based upon the determination of whether to hide the program code corresponding to the at least one of the at least one layer file.

3. The method of claim 2, further comprising:
   detecting a selection of at least two layer files by the user; and
   merging the at least two layer files to generate a new layer file comprising a new abstract syntax tree corresponding to the at least two layer files.

4. The method of claim 2, where displaying the program code corresponding to the at least one layer file and the main program comprises:
   differentiating between the program code corresponding to the at least one layer file and the program code corresponding to the main program using a recognition marker, where the recognition marker comprises at least one of a background color, a text color, a frame line, a font, and a transparency.

5. The method of claim 2, where displaying the program code corresponding to the at least one layer file and the main program comprises:
   displaying the program code corresponding to the at least one layer file and the main program in a program code displaying region; and
   displaying descriptive information corresponding to the at least one layer file in a layer management region.

6. The method of claim 2, further comprising:
   detecting a selection of at least one layer file by the user; and flattening the at least one layer file and the main program to generate a new main program using the layer abstract syntax tree corresponding to the at least one layer file.

7. A computer program product comprising a computer readable storage medium including computer readable program code, where the computer readable program code when executed on a computer causes the computer to:
  retrieve a main program from a memory;
  initiate a layer representing a portion of the main program for editing on a display;
  edit program code within the layer in response to detected user programming inputs;
  generate a layer abstract syntax tree corresponding to the edited program code;
  compare the layer abstract syntax tree with a main program abstract syntax tree; and
  generate a layer file comprising differences between the layer abstract syntax tree and the main program abstract syntax tree.

8. The computer program product of claim 7, where in causing the computer to retrieve the main program from the memory, the computer readable program code when executed on the computer causes the computer to:
  retrieve at least one layer file associated with the main program from the memory;
  display program code corresponding to the at least one layer file and the main program; and
  where the computer readable program code when executed on the computer further causes the computer to:
    determine whether to hide the program code corresponding to at least one of the at least one layer file in response to a detected user input from a user; and
    where in causing the computer to initiate the layer representing the portion of the main program for editing on the display, the computer readable program code when executed on the computer causes the computer to initiate the layer based upon the determination of whether to hide the program code corresponding to the at least one of the at least one layer file.

9. The computer program product of claim 8, where the computer readable program code when executed on the computer further causes the computer to:
  detect a selection of at least two layer files by the user; and
  merge the at least two layer files to generate a new layer file comprising a new abstract syntax tree corresponding to the at least two layer files.

10. The computer program product of claim 8, where in causing the computer to display the program code corresponding to the at least one layer file and the main program, the computer readable program code when executed on the computer causes the computer to:
  differentiate between the program code corresponding to the at least one layer file and the program code corresponding to the main program using a recognition marker, where the recognition marker comprises at least one of a background color, a text color, a frame line, a font, and a transparency.

11. The computer program product of claim 8, where in causing the computer to display the program code corresponding to the at least one layer file and the main program, the computer readable program code when executed on the computer causes the computer to:
  display the program code corresponding to the at least one layer file and the main program in a program code displaying region; and
  display descriptive information corresponding to the at least one layer file in a layer management region.

12. The computer program product of claim 7, where the computer readable program code when executed on the computer further causes the computer to:
  detect a selection of at least one layer file by the user; and
  flatten the at least one layer file and the main program to generate a new main program using the layer abstract syntax tree corresponding to the at least one layer file.

13. A system for hierarchical program source management, comprising:
  a display;
  a memory for storing a main program; and
  a processor programmed to provide a program development interface via the display and to:
    retrieve the main program from the memory;
    initiate a layer representing a portion of the main program for editing on the display;
    edit program code within the layer in response to detected user programming inputs;
    generate a layer abstract syntax tree corresponding to the edited program code;
    compare the layer abstract syntax tree with a main program abstract syntax tree; and
    generate a layer file comprising differences between the layer abstract syntax tree and the main program abstract syntax tree.

14. The system of claim 13, where, in being programmed to retrieve the main program from the memory, the processor is programmed to:
  retrieve at least one layer file associated with the main program from the memory;
  display program code corresponding to the at least one layer file and the main program on the display; and
  where the processor is further programmed to:
    determine whether to hide the program code corresponding to at least one of the at least one layer file in response to a detected user input from a user; and
    where in being programmed to initiate the layer representing the portion of the main program for editing on the display, the processor is programmed to initiate the layer based upon the determination of whether to hide the program code corresponding to the at least one of the at least one layer file.

15. The system of claim 14, wherein the processor is further programmed to:
  detect a selection via the program development interface of at least two layer files by the user; and
  merge the at least two layer files to generate a new layer file comprising a new abstract syntax tree corresponding to the at least two layer files.

16. The system of claim 14, where, in being programmed to display the program code corresponding to the at least one layer file and the main program, the processor is programmed to:
  differentiate between the program code corresponding to the at least one layer file and the program code corresponding to the main program using a recognition marker, where the recognition marker comprises at least one of a background color, a text color, a frame line, a font, and a transparency.

17. The system of claim 14, where, in being programmed to display the program code corresponding to the at least one layer file and the main program, the processor is programmed to:
  display the program code corresponding to the at least one layer file and the main program in a program code displaying region on the display; and display descriptive information corresponding to the at least one layer file in a layer management region on the display.

18. The system of claim 13, where the processor is further programmed to:
  detect a selection of at least one layer file by the user; and
  flatten the at least one layer file and the main program to generate a new main program using the layer abstract syntax tree corresponding to the at least one layer file.

* * * * *